United States Patent [19]
Harvey et al.

[11] 3,907,874
[45] Sept. 23, 1975

[54] VICINAL GLYCOL ESTER PREPARATION PROCESS

[75] Inventors: Robert Joseph Harvey, Teaneck; John Kollar, Wyckoff, both of N.J.; John Philip Schmidt, New York, N.Y.

[73] Assignee: Halcon International, Inc., New York, N.Y.

[22] Filed: Aug. 9, 1972

[21] Appl. No.: 278,903

[52] U.S. Cl............................................. 260/497 R
[51] Int. Cl.² ................... C07C 67/08; C07C 69/16
[58] Field of Search ................................ 260/497 R

[56] References Cited
UNITED STATES PATENTS

| | | | |
|---|---|---|---|
| 3,479,395 | 11/1969 | Huguet | 260/497 R |
| 3,668,239 | 6/1972 | Kollar | 260/497 R |
| 3,689,535 | 9/1972 | Kollar | 260/497 R |

*Primary Examiner*—Anton H. Sutto
*Assistant Examiner*—Richard D. Kelly
*Attorney, Agent, or Firm*—William C. Long; David Dick; Riggs T. Stewart

[57] ABSTRACT

When vicinal glycol esters are prepared by the liquid phase reaction of (a) ethylene or propylene, (b) molecular oxygen and (c) a carboxylic acid in the presence of a catalyst system which is tellurium cation plus bromide anion or selenium cation plus chloride anion or selenium cation plus bromide anion, significant improvements in selectivity and operability are obtained by employing, in conjunction with these catalyst systems, a basicity control cation of specified characteristics. This cation is employed in an amount at least sufficient to provide at least 0.05 equivalent of cation per gram-atom of halogen present.

26 Claims, 1 Drawing Figure

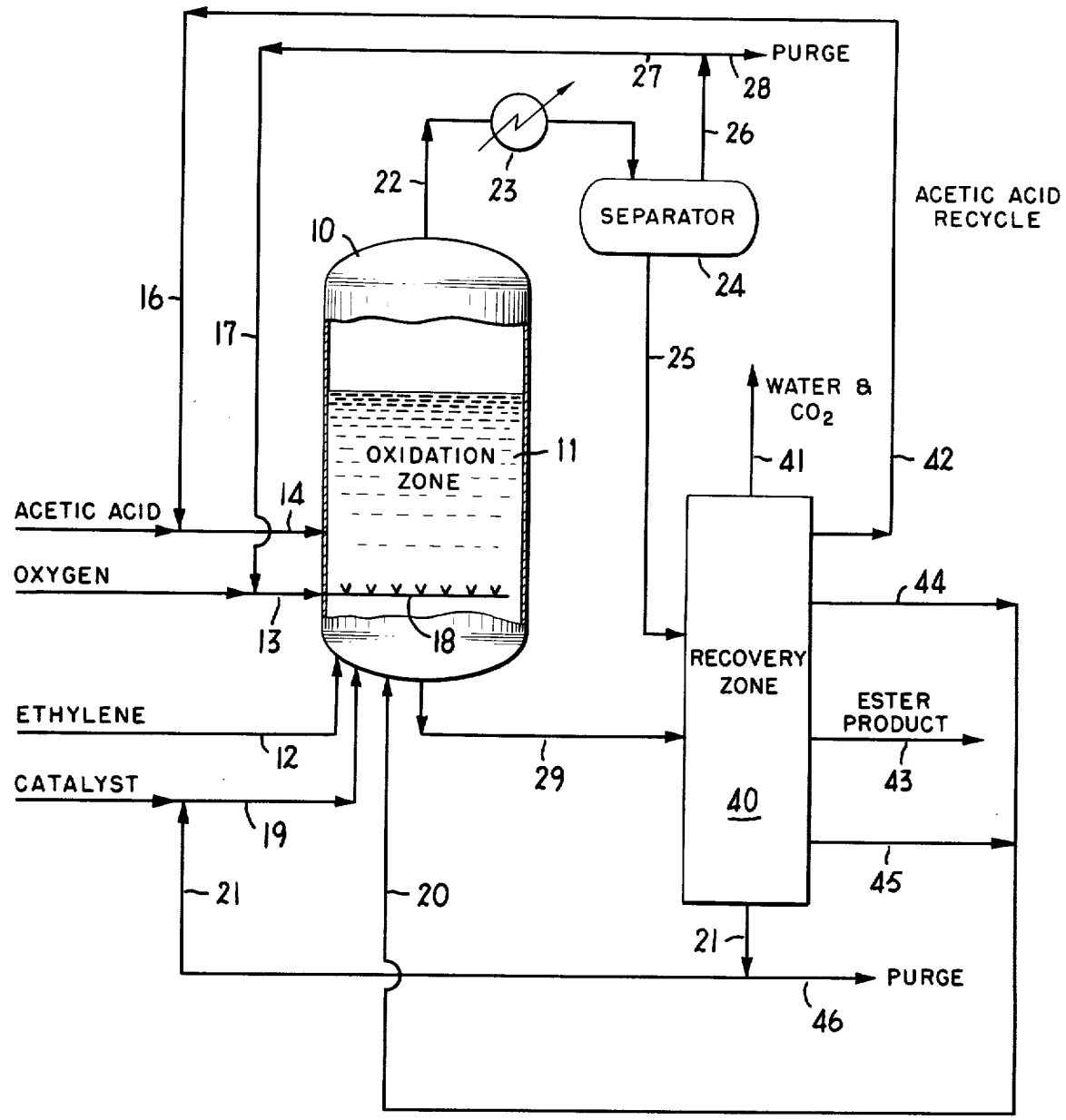

VICINAL GLYCOL ESTER PREPARATION PROCESS

BACKGROUND OF THE INVENTION

This invention relates to a process for the preparation of vicinal glycol esters by the liquid phase reaction of (a) an olefinically unsaturated compound, (b) molecular oxygen and (c) a carboxylic acid. The esters produced by the process of this invention are valuable chemical intermediates, useful in the manufacture of the glycols as well as in the production of monomers for several different polymers, e.g., polyvinyl alcohol, the polyvinyl acetals, polyesters and the like. Accordingly, interest in high yield processes for producing such esters is burgeoning, and a variety of such processes have been proposed in recent years.

Those catalyzed by the noble metals of Group VIII of the periodic table, typically palladium, suffer from obvious drawbacks because of the cost of the catalyst itself and because of the additional capital expenditures needed to prevent loss of noble metal from the process system. Moreover, such processes apparently are not capable of as high a selectivity to the desired vicinal glycol esters as desired, because the noble metal catalyzed systems seem to produce significant quantities of carbonyl by-products and 1,1-substituted by-products, thereby reducing the amount of raw material converted to the desired 1,2-substituted products.

The art has therefore proposed alternative procedures based on catalytic systems other than the noble metals. One such alternative catalyst system is based upon tellurium. Others have proposed use of selenium dioxide as an oxidant in lieu of molecular oxygen (see Olson, U.S. Pat. No. 3,427,348); but this requires the use of mineral acids, itself costly, and gives but poor selectivity to 1,2-substituted products and further requires exhorbitant amounts of the oxide since molar, not catalytic, quantities are needed.

Tellurium-based processes avoid the problems associated with the use of noble metals but are themselves not devoid of problems. For example, Huguet, U.S. Pat. No. 3,479,395, points out the poor solubility characteristics of tellurium and its compounds and teaches that tellurium's solubility can be increased by incorporation of chloride ion into the liquid phase reaction medium. Huguet, however, apparently considered only the oxidation reactive reaction olefins such as butene-2 and higher olefins and failed to examine ethylene or propylene — unreactive species which require quite different reaction conditions. Moreover, by focusing essentially on the use of chloride ion, Huguet failed to realize that the halogen anion could be a vital component of a successful catalyst system and not merely a solubilization acid. Thus, Huguet's process, even carried out at the maximum temperature be discloses (not exceeding 150°C.), displays quite low reaction rates when using other than the highly reactive olefins such as butene-2 which Huguet exemplifies; indeed, the rates observed in Huguet's process when using such unreactive olefins as ethylene or propylene are so low as to be of no commercial significance or interest. Even when Huguet's teachings with respect to temperature are disregarded and his process is conducted at substantially higher temperature than taught by Huguet, the rates are still so low as to render the process commercially impracticable. On the other hand, when attempting to operate the Huguet process with reactive olefins such as butene-2 at temperatures of 150°C. or above, excessive combustion of the olefin reactant occurs; the result is a process giving extremely poor selectivity.

The process disclosed in U.S. Pat. No. 3,668,239 graphically illustrated the deficiencies involved in the process discussed in the preceding paragraph. The process of this more recent patent discloses the synergistic combination of cationic tellurium and anionic bromine. Extraordinarily high reaction rates, together with quite high selectivity, were achieved by carrying out the reaction in highly acid environments, i.e., at a liquid phase reaction medium pH of less than 2.0.

Further study of the reaction system disclosed in this more recent patent has, however, led to the uncovering of problems not heretofore realized. The extraordinarily high reaction rates of this patent are not attained without formation of significant quantities of troublesome by-products as well as the expected carbon oxides ($CO$ and $CO_2$) produced by total combustion of reactants. These troublesome by-products are carboxylic acids of fewer carbon atoms than those of the desired reactants and apparently are formed by carbon-carbon scission of both the olefin and acid reactants. Except where formic acid is the reactant of choice and formate ester products are desired, these scission reactions result in the formation of mixed ester products. Even when formate esters are desired, the scission reactions are disadvantageous both because of olefin losses and because such reactions are accompanied by combustion of the formic acid reactant to form carbon oxides, thereby creating some degree of selectivity loss beyond that which would otherwise be expected.

The presence of mixed ester products considerably increases the complexity and expense involved in the recovery and purification of pure ester products. Such mixed esters are of low volatility, and there is an absence of substantial difference in volatility between a glycol ester of one acid and a glycol ester of an adjacent homologous acid. Moreover, byproduct acids when formed tend to build up in recycle streams when return of unconverted reactants to the reaction zone (necessary for commercial operation) is attempted. Control of this build-up requires purification of recycle streams or requires that a significant portion of the recycle stream be purged to limit build-up. The former alternative is difficult because, by way of illustration, removal of small amounts of formic acid from an acetic acid recycle stream is not simply or cheaply accomplished. The latter alternative is also highly undesirable since it represents a clear yield loss.

In sum, therefore, the scission reactions encountered in the process of U.S. Pat. No. 3,668,239 tend to diminish the attractiveness of the process and render it more complex than heretofore realized, even though extremely high reaction rates and relatively high selectivities are obtainable.

Correspondingly, the art has long sought a relatively simple and straightforward process for the production of glycol esters of unreactive olefins (e.g., ethylene and propylene) which will enable attainment of high rates together with selectivities approaching theoretical. To date, these goals have been achieved for a variety of reasons, some of which have been outlined above.

SUMMARY OF THE INVENTION

In contrast to the art discussed above, the process of this invention permits attainment of extremely high reaction rates together with selectivities readily exceeding 90% of theoretical and, in many embodiments, even exceeding 95% of that theoretically obtainable. These disadvantages are achieved by a combination of factors. One involves the reaction temperature which must be in excess of 150°C., but preferably not in excess of about 250°C. Another is the incorporation within the liquid phase reaction medium of a basicity control cation in an amount sufficient to provide at least 0.05 equivalent of basicity control cation per gram-atom of halogen present within the liquid phase reaction medium. Under defined conditions, the basicity control cation must have an activity coefficient of at least 0.40. Correspondingly, the basicity control cation must not have a pH-reducing effect, presence or absence of a "pH-reducing effect" again being determined under defined conditions.

The defined conditions referred to in the preceding paragraph are as follows: "Activity coefficient" refers to the electrolytic activity coefficient of the basicity control cation when in the form of a halide salt (the halogen being that employed as a component of the catalyst system). Activity coefficients are ascertained at concentrations of the halide salt in water at 25°C. which are 0.1N or saturated, whichever is the more dilute. Any of the standard methods for determination of such coefficients such as freezing point depression or electromotive force measurements (see Prutton and Maron, *Fundamental Principles of Physical Chemistry*, rev. ed., Macmillan, New York (1951) at pp. 474 et seq.) are eminently suitable.

Presence of absence of a pH-reducing effect is readily determined by a comparative test, with the basicity control cation being in the form of the salt of the carboxylic acid reactant. The test requires comparison of the pH of a 0.1N or saturated solution of the carboxylic acid reactant in water, whichever is the more dilute, with the pH of an otherwise identical solution which also contains 0.10 equivalent of the basicity control cation or which is saturated with respect to the cation salt if this requires less than 0.10 equivalent. The former is the "standard solution," while the latter is the "test solution." Both solutions are heated to 50°C. in sealed containers, maintained at this temperature for 6 hours, cooled to 25°C., and the pH of both is measured. If the pH of the test solution is equal to or greater than the pH of the standard solution, there is an absence of a pH-reducing effect.

Defining activity coefficient and pH-reducing effect of the basicity control cation in terms of salts is essential since, independent of the form in which the cation is initially supplied, it is converted, in situ, in part to a mixture of halide and carboxylate.

Overall, then the process of this invention deals with the preparation of a $C_1$–$C_5$ hydrocarbyl aliphatic carboxylic acid ester of a $C_2$–$C_3$ vicinal glycol such as, for example, ethylene glycol diacetate (1,2-diacetoxyethane), ethylene glycol monoacetate (1-acetoxyethan-2-ol), propylene glycol dipropionate (1,2-dipropionoxypropane), propylene glycol monopropionate (1-propionoxypropan-2-ol and 2-propionoxypropan-1-ol) and like vicinal glycol ester products. These esters are prepared by the catalytic liquid phase reaction of (a) an olefin corresponding in structure to the glycol moiety of the desired ester product and selected from the group consisting of ethylene and propylene, (b) molecular oxygen and (c) a monobasic aliphatic hydrocarbyl carboxylic acid of 1–5 carbon atoms corresponding in structure to the acyl (i.e.,

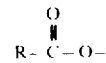

wherein "R" is hydrogen or $C_1$–$C_4$ alkyl) moiety of the desired ester. The reaction is carried out within an oxidation zone which contains the liquid phase medium wherein the reaction occurs, the medium comprising reactants, catalyst, the desired reaction products and halogenated byproducts.

The process of this invention is particularly advantageous for use in continuous operation on large scale, and continuous operation is therefore preferred. To render the reaction continuous, as required in preferred practice of this invention, the reactants are continuously introduced into the oxidation zone and at least a portion of the liquid phase reaction medium is continuously withdrawn, either as liquid or as vapor or as both, at a rate sufficient to prevent build-up of liquid phase reaction medium. If withdrawn as liquid, the withdrawn portion of the medium is usually a representative sample of the total reaction medium while, if withdrawn as a vapor, the withdrawn material would consist only of the volatile portion of the reaction medium and thus would not be truly representative of the total liquid phase composition. The withdrawn portion of the reaction medium is processed to recover the desired ester products, unconverted reactants and halogenated byproducts, with the unconverted reactants being recycled to the oxidation zone.

The catalyst system employed in the process of this invention is a tellurium or selenium cation in combination with a halide anion, the combination being selected from the group consisting of tellurium cation plus bromide anion, selenium cation plus bromide anion and selenium cation plus chloride anion. The excluded combination, that of tellurium cation plus chloride anion, has been found of but poor effectiveness under all conditions tested, unless employed in conjunction with one of the foregoing effective catalyst systems.

When operating in the preferred continuous fashion, in addition to unconverted reactants, at least a predominant portion of the halogenated by-products are recycled to the oxidation zone. This recycle stream provides a substantial (but not necessarily predominant) portion of the halogen conpoment of the catalyst system and assists in sustaining high rates of reaction and in providing high selectivity. Even when operating batchwise, supply of a portion of the halogen in the form of halogenated byproducts from previous batches is highly desirable.

Other essential factors in the conduct of the process of this invention, the employment of a basicity control cation and reaction temperature, have been referred to above.

A more complete understanding of the surprising characteristics of this invention involves further exposition of the process described in U.S. Pat. No. 3,668,239. The process of this prior patent is anomalous in its temperature/reaction-rate relationships. With the process of this prior patent, normal temperature/reaction-rate relations are observed at reaction temperatures below about 140°C., i.e., when below 140°C., as temperature increases slightly (say, 5–10°C.), reaction rate increases. However, as temperature is increased about 140°C., the dependency of reaction rate upon temperature diminishes and then ceases, and no statistically significant difference in reaction rate is detected between operations at, say, 140°C. and operations at, say, 180°C.

Consider now operation in accordance with this invention: At a temperature of 150°C., introduction of the basicity control cation initially tends to reduce reaction rate, the extent of reduction being dependent upon the ratio of basicity control cation to halogen — the higher the ratio, the lower the rate. Particularly in preferred regimes of operation, however, introduction of the basicity control cation results in two completely unexpected phenomena.

First, scission reactions are sharply suppressed, readily by a factor of 5 to 10 or more. For example, when acetic acid is the reactant and an effluent containing 1–2 wt. % formic acid was obtained by the process of the prior patent, an effluent containing 0.2 wt. % formic acid or less is readily obtained by the process of this invention, and effluents containing 0.10 wt. % of formic acid or less are frequently obtainable.

Equally surprising, however, is that the presence of the basicity control cation restores the normal temperature/reaction-rate relationship. Thus, for example, while reaction rate at temperature only marginally above 150°C. by the process of this invention is often lower than that of the prior patent, a fundamental difference exists because the rate detriment can readily be overcome by increasing reaction temperature, and operations at 170°–200°C. gives rates as high or higher than those observed in the process of the prior patent. The following Table illustrates the phenomena observed and is based on an arbitrary assignment of a reaction rate of 1.0 to the process set forth in Run 6 of example 1 of U.S. Pat. No. 3,668,239 (referred to as "the prior art" in the Table) with other reaction rates being expressed relative to that of the prior art, i.e., a relative reaction rate of 0.8 means that the rate observed is 80% of that observed in the prior art "standard run." The column headed "% Formate" is on a weight basis and is indicative of the extent of the scission reactions occurring and includes not only free formic acid present in the effluent but also includes formate ester moieties, expressed as formic acid.

| Process of | Temperature, °C. | Relative Reaction Rate | % Formate |
|---|---|---|---|
| the prior art | 160°C. | 1.0 | 1.0 |
| the prior art | 140°C. | 1.0 | 0.9 |
| the prior art | 170°C. | 1.0 | 1.1 |
| the prior art | 190°C. | 0.9 | 1.1 |
| this invention | 155°C. | 0.35 | 0.07 |
| this invention | 165°C. | 0.67 | 0.17 |
| this invention | 180°C. | 1.25 | 0.20 |
| this invention | 200°C. | 1.40 | 0.29 |

Runs according to "this invention" as given above are based upon an especially preferred mode of operation where the basicity control cation is lithium and is employed in a ratio of 1:1 (equivalents of lithium per gram-atom of bromine present in the liquid phase reaction medium). The cation of the catalyst system in all of the above runs is tellurium, initially supplied as the dioxide. Selectivity in "the prior art" runs is in the 85–88 mole % range while in the runs of this invention is in the 92–88 mole % range.

Why the basicity control cation should so profoundly affect the mechanism of the reaction, as the above Table so clearly shows it to do, is difficult to understand. However, the basicity control cation clearly does not function as a redox agent, as commonly employed in noble metal catalyzed processes. Were the basicity control merely a redox agent, rate enhancement at essentially any temperature would be observed. In contrast, however, rate suppression is the phenomenon first noted at temperatures in the 150°–160°C. regime; not until temperatures above about 160°C. are employed is rate restored to the level obtained in the prior art. Whatever the role of the basicity control, it differs fundamentally from that of a redox system or a component thereof.

Moreover, operation in accordance with this invention profoundly affects the nature of the reaction effluents obtained. In this process, aside from the desired ester products and unconverted reactants, relatively minor amounts of halogenated by-products are formed. In the process of the prior patent, on the other hand, a large proportion of the reaction products are halogenated organic compounds. While these halogenated organics are valuable precursors of the desired esters, reduction in the amount of them formed is of significant advantage. Reducing the amount of halogenated organics simplifies product recovery and reduces corrosion problems in subsequent processing equipment, thereby further enhancing the economic attractiveness of this process.

DETAILED DESCRIPTION OF THE INVENTION a. Basicity Control Cation

A key feature of this invention requires the use of a basicity control cation in the catalytic liquid phase reaction of an olefin with oxygen and with a carboxylic acid to produce vicinal glycol esters. The basicity control cation can be inorganic or organic. Among the suitable inorganic cations are the cations of the alkali metals, the alkaline earth metals, the metals of the lanthanide series, scandium, yttrium, iron, cobalt, nickel, zinc, bismuth, chromium, manganese, molybdenum, copper, arsenic and anitmony.

Suitable organic basicity control cations include the cations resulting from dissociation of organic amines and quaternary ammonium salts as well as basic heterocyclic compounds such as pyrrole, pyridine, indole and alkyl-substituted derivatives of such heterocyclic compounds (containing 1–3 alkyl substituents, each substituent having up to 4 carbon atoms). Thus, in addition to pyrrole, pyridine, indole and the alkyl-substituted derivatives of these materials, it is generally practicable to use $C_1$–$C_{10}$ alkyl amines; primary, secondary or tertiary amines all being suitable. Correspondingly, aryl amines, particularly the phenyl amines (including nuclearly, alkylsubstituted phenyls having 1–3 alkyl substituents, each substituent having up to 4 carbon atoms) are also employable; here too primary, secondary and tertiary aryl amines are employable. Quaternary ammonium salts corresponding to the foregoing amines are eminently suitable materials as well.

Of the foregoing inorganic basicity control cations, the cations of the alkali metals, the alkaline earth metals, cobalt, manganese cerium, arsenic and antimony are desirably employed. The $C_2$–$C_3$ tertiary trialkyl ammonium cations and the corresponding tetra-alkyl ammonium cations are the desirably employed organic basicity control cations. Especially advantageous results are obtained with the alkali metal and cobalt cations, with the most preferred basicity control cations being lithium cation and cobalt cation.

It is, of course, apparent that mixtures of suitable basicity control cations can be employed and that these cations can be supplied to the reaction system in the normal commercially available forms, no need for specially purified materials existing.

It should also be generally noted that it is usually more desirable to use inorganic basicity control cations than to use organic ones because the organics are somewhat volatile and thus more subject to handling losses as well as to loss through oxidation. In many instances, however, these detriments are of no significance and, from a process standpoint, the organic materials function well in suppressing scission reactions as well as in facilitating the obtaining of high reaction rates. Nonetheless, where the organic basicity control cations are to be employed, it is generally preferred to employ those having hydrocarbon moieties corresponding in carbon structure to one or more of the reactants. Thus, for example, the ethyl ammonium cations including tetraethylammonium species would be advantageous cations where ethylene is a reactant, while the propyl ammonium cations including the tetrapropylammonium species would be advantageous cations when propylene is the reactant.

The basicity control cation initially can be supplied to the oxidation zone in any form which, in solution or suspension under oxidation conditions, will yield at least some soluble basicity control cation. Thus, dealing with inorganic basicity control cations, there can be supplied by introduction of the material in the elemental form as well as in the form of compounds, both organic and inorganic. Suitable organic forms in which the basicity control cation can be introduced typically include the carboxylate salts of $C_1$–$C_{20}$ alkyl mono- or di-basic hydrocarbyl carboxylic acids, the naphthenate salts (see *Condensed Chemical Dictionary*, 6th ed., Reinhold (1961) at page 778) of up to 20 carbon atoms, the salts of the hydrocarbyl aromatic carboxylic acids (preferably monophenyl such as the benzoate and lower alkyl-substituted benzoates such as the toluates, etc.) and the salts of the hydroxy-substituted monobasic aliphatic carboxylic acids (such as the lactates, citrates, glycolates, tartarates, hydrocrylates, hydroxybutyrates, etc.). Organo-metallic forms of the cations such as, for example, tri- and penta-alkyl stibines or aryl stibines, such as triphenylstibine, can also be employed.

Supply of the basicity control cation in the form of inorganic compounds is also readily practicable. Suitable inorganic forms include the hydrides, oxides, hydroxides, carbonates, bicarbonates, halides (preferably bromides or chlorides), phosphates, sulfates and nitrates. Heteropoly forms such as, for example, sodium phosphomolybdate are also suitable.

Supply of the cations in the finely divided elemental form as well as in the form of their halides, oxides, hydroxides, carbonates, bicarbonates or as the cation salt of the carboxylic acid reactant is normally preferred.

From the foregoing, it is readily apparent that the anion, if any, associated with the source of make-up basicity control cation is in no way critical. This is essentially so because, no matter in what form supplied, the basicity control cation will tend to react in situ to form a mixture of carboxylate salt (the carboxylate moiety being that derived from carboxylic acid reactant) together with halide salts and oxyhalides (the halide being the halogen component of the catalyst system).

The Overall Reaction and Reactants Employed

The reaction of the instant invention is an oxidation wherein an olefin (ethylene or propylene), molecular oxygen and a monobasic carboxylic acid are converted in a carboxylate ester of a vicinal glycol. The glycol moiety of the ester corresponds in carbon structure to the olefin reactant, while the acyl moiety of the ester corresponds to that of the carboxylic acid reactant. The following chemical equations illustrate the overall chemical reactions involved in this process and, for illustrative purposes, are based upon the use of ethylene and acetic acid as reactants:

$$CH_2=CH_2 + \tfrac{1}{2} O_2 + 2H_3C-COOH \rightarrow H_3C-\overset{\overset{O}{\|}}{C}-O-CH_2-CH_2-O-\overset{\overset{O}{\|}}{C}-CH_3 + H_2O$$

$$CH_2=CH_2 + \tfrac{1}{2} O_2 + H_3C-COOH \rightarrow H_3C-\overset{\overset{O}{\|}}{C}-O-CH_2-CH_2-OH$$

The molecular oxygen reactant can be supplied as such (i.e., in concentrated form having an oxygen content of 85 mole % or more) or can be supplied in the form of air or in the form of enriched air or as diluted air. When diluents are used, the diluent can be any gas or mixture of gases which is inert under the reaction conditions such as nitrogen, helium, neon, argon or carbon dioxide as well as the normally gaseous paraffins (methane, propane or ethane).

The olefin reactant, ethylene or propylene, need not be specially purified and can contain normal quantities of the conventional impurities. Thus, for example, when ethylene is the olefin, it can contain the normal quantities (up to 10 mole %) of ethane together with the usual trace amounts of acetylenic compounds. It should also be noted that there is no fundamental process reason why mixtures of ethylene and propylene cannot be used in the process of this invention, however, when such mixtures are used, mixed products are obtained.

Suitable carboxylic acid reactants are the monobasic hydrocarbyl aliphatic carboxylic acids having from 1 to 5 carbon atoms per molecule and thus include formic acid, acetic acid, propionic acid, butyric acid, isobutyric acid and the valeric acids. Of these, the use of formic acid, acetic acid and propionic acid is desired, while acetic acid is the one most preferably employed. As in the case of the olefin, the use of mixed acid reactants is technically feasible but will result in the obtaining of mixed ester products. Also, as in the case of the olefin, the carboxylic acid reactant need not be specially purified and can contain the normal impurities therein found. Commercially available forms of these acids including aqueous solutions are employable. It is preferred, however, to employ these reactants in forms having minimal water contents, i.e., desirably less than 25% by weight and preferably less than 15% by weight of water.

The Catalyst System

The catalyst system employed in the process of this invention fundamentally is a combination of a selenium or tellurium cation together with a halide anion, the combination being selected from the group consisting of tellurium cation plus bromide anion, selenium cation plus bromide anion and selenium cation plus chloride anion. The selenium or tellurium component can be supplied to the system in any form which, in solution or suspension under oxidation conditions, will yield at least some soluble cation. For example, the selenium or tellurium can be supplied in the finely divided elemental forms or as the carbonate, oxide, hydroxide, bromide, chloride, lower ($C_1$-$C_3$) alkoxide, e.g., the methoxide, phenoxide or as a carboxylate salt wherein the carboxylate ion is the same as or different from the acid reactant. In preferred operation, the Se or Te cation is supplied as the oxide, halide (bromide or chloride), hydroxide or salt of the acid reactant. It should be noted that mixtures of selenium and tellurium can also be employed but that there is neither advantage or detriment to use of such mixtures. The catalyst cation, as in the case of the reactants, can be supplied in ordinarily available commercial forms containing normal quantities of the usual impurities. Finally, irrespective of the form in which the cation component of the catalyst system is supplied, it will probably be converted in situ into a complex mixture containing the free element, the carboxylate salt, the halide form, the oxyhalide form together with the oxide or oxides.

The halides can also be supplied in any form which under reaction conditions yields the appropriate halide anions in solution. For example, one may use elemental bromide or chlorine, the corresponding hydrohalic acid, the alkali or alkaline earth metal halides, heavy metal halides such as cobalt or manganese, bromide or chloride and the like. Organo-halogen compounds such as the alkyl trihalides and similar organo-halogen compounds are compounds capable of producing halogen anions and are also suitable.

A preferred aspect of the process of this invention, however, calls for the supply of a substantial portion of the halogen by recycle to the oxidation zone of at least part of the organo-halogen compounds produced as byproducts in the main reaction. These organo-halogen byproducts are halogen derivatives of the olefin reactant and of the reaction products. For example, when the ethylene is the olefin and bromine the halogen, these would include but not be limited to 1,2-dibromoethane; ethylene bromohydrin; 2-bromoethyl carboxylate and diethylene glycol dibromide (2,2'-dibromodiethyl ether). Obviously, a mixture of two or more halogen-producing compounds would, by the fundamental characteristics of the process, normally be present and would be employed. Single halogen sources would not normally be employed, except during start-up.

Relative proportions of catalyst system ingredients and basicity control cation are important factors in obtaining optimum selectivities and rates. It has been found that optimal results require the presence of from 0.1 to 10 wt. % of selenium or tellurium in the liquid phase reaction medium. Desirably 0.3-5.0 wt. % and preferably 0.4-3 wt. % of selenium or tellurium within the liquid phase reaction medium are employed. It is of considerable importance in optimizing rate and selectivity to assure the presence of more than one gram-atom of total halogen per gram-atom of total tellurium or total selenium present. Desirably the catalyst system contains at least 4 gram-atoms of halogen per gram-atom of selenium or tellurium and preferably at least 5 gram-atoms of halogen per gram-atom of selenium or tellurium. On the other hand, upper limits on the ratio of halogen to selenium or tellurium do not seem overly critical, and ratios of the order of 30:1 or even more can be employed. Desirably, however, ratios of 25:1 or less are employed, and preferably ratios of 20:1 or less are employed. The following Table summarizes on an overall basis the broad, desirable and especially preferred proportions of the two key catalyst components to each other.

|  | Broad | Desired | Preferred |
|---|---|---|---|
| Wt. % selenium or tellurium in the liquid phase reaction medium | 0.1–10.0 | 0.3–5.0 | 0.4–3.0 |
| Gram-atoms of halogen (Br or Cl) per gram-atom of selenium or tellurium present within the liquid phase reaction medium | 3–30 | 4–25 | 5–20 |

The basicity control cation, of course, exerts a profound effect upon the performance of the catalyst system and, also as indicated, must be present in an amount sufficient to provide at least 0.05 equivalent (gram basis) per gram-atom of total halogen present within the liquid phase reaction medium. Amounts greater than this minimum further suppress the scission reactions, and accordingly it is desired to employ at least 0.2 equivalent of basicity control cation per gram-atom of total halogen and it is preferred to employ at least 0.5 equivalent of basicity control cation per gram-atom of total halogen. Also as heretofore indicated, however, the role of the basicity control cation is to influence the performance of the catalyst systems and, if employed in too great a quantity, the cation can adversely effect catalyst system performance. Accordingly, it is generally not desired to employ more than 5.0 equivalents of basicity control cation per gram-atom of total halogen present within the liquid phase reaction medium, and generally it is more desirable to employ below 3.0 equivalents of basicity control cation per gram-atom of total halogen present. It is preferred to employ less than 2.0 equivalents of basicity control cation per gram-atom of total halogen present in the liquid phase reaction medium. More advantageous results, and consequently the most preferred regime of operation, involves employment of between 0.5 and 1.5 equivalents of basicity control cation per gram-atom of total halogen in the liquid phase reaction medium.

d. Reaction Conditions

Other conditions within the oxidation zone can effectively be varied over a relatively wide range. The mole ratio of oxygen to olefin fed to the reaction system is not of significant criticality, and therefore ratios (mole basis) from about 1:1000 to about 1:0.001 can be used though, of course, care should be taken to avoid formation of flammable mixtures.

The rate at which carboxylic acid reactant is fed to the oxidation zone is also not critical so long as the rate is sufficient to maintain an excess of acid over that stoichiometrically needed for the reaction; thus, essentially, acid reactant feed rate is determined by maintenance of a constant inventory of liquid phase reaction medium within the oxidation zone.

Reaction time, i.e., residence time within the oxidation zone, can vary widely and, in continuous operation, is conveniently expressed in terms of the quotient obtained by dividing the volume of liquid phase reaction medium by the rate at which liquid phase reaction medium is withdrawn from the oxidation zone. Flow rates are preferably adjusted so that the rate of formation of product, meaning rate of formation of glycol moieties, is from about 0.7 to about 4.0 gram-moles per liter of liquid phase reaction medium per hour.

Reaction temperature, as indicated, must exceed 150°C., desirably exceeds 155°C. and preferably exceeds 160°C. Upper limit on reaction temperature is not of great criticality but ought not to exceed 250°C. and preferably would not exceed about 240°C.

Reaction pressure is not of criticality so long as it is sufficient to maintain a liquid phase reaction medium, and subatmospheric, atmospheric or superatmospheric pressures are thus employable. Pressures as high as 5000 p.s.i.a. or more can be used, but it is normally preferred to operate with pressures between about 20 p.s.i.a. to about 1000 p.s.i.a., while operation with pressures between about 50 p.s.i.a. to about 700 p.s.i.a. is especially preferred.

c. The Liquid Phase Reaction Medium

As hereinbefore indicated, the environment in which the ester formation reaction occurs is a liquid phase reaction medium confined within the oxidation zone. This medium contains the carboxylic acid reactant, the ester products of the reaction, precursors of the desired ester product of the reaction, reaction by-products including halogenated reaction byproducts, as well as, of course, the catalyst system employed, including the basicity control cation. Dissolved olefin reactant and dissolved oxygen are also present therein.

In preferred practice, which as hereinbefore indicated calls for continuous operation, a portion of this liquid phase reaction medium is continuously withdrawn from the oxidation zone and processed to recover reaction products, unconverted reactants and halogenated byproducts. The liquid phase reaction medium can, of course, be withdrawn as a liquid, but it is equally feasible to conduct the reaction of this invention in such a manner as to continuously volatilize a portion of the liquid phase reaction medium and withdraw it as a vapor. Where the liquid phase reaction medium is withdrawn from the oxidation zone as a liquid it, of course, is a representative sample of the total liquid phase composition but, where withdrawn as a vapor, the withdrawn medium would be of a composition approaching that which is in equilibrium with the liquid phase medium.

The terms "precursors of the desired ester products," and "reaction by-products" as well as "halogenated reaction by-products," all used in the preceding two paragraphs, overlap substantially because all are to a substantial extent precursors of the desired ester products and are included in assessing both reaction rate and reaction selectivity. The finally desired products of the process of this invention are vicinal glycol esters including both mono- and di-esters. The valuable byproducts, valuable because they are precursors of the desired ester products, include the glycol corresponding to the olefin itself (i.e., glycol and/or propylene glycol) and higher boiling ether-alcohols and ether-alcohol mono- and di-esters. The halogenated byproducts which are also formed are also precursors, the halogen corresponding to that employed as a component of the catalyst system. Illustrative of the nature of the higher boiling materials formed (assuming the olefin to be ethylene and the monobasic carboxylic acid to be acetic acid) are diethylene glycol, triethylene glycol and their mono- and di-acetate derivatives. The halogenated byproducts have been described above in connection with the catalyst system and include (assuming bromide to be the catalyst system anion) ethylene bromohydrin; 2-bromoethyl acetate; 1,2-dibromoethane and brominated derivatives of the higher boiling materials.

DESCRIPTION OF THE DRAWING

The annexed drawing is presented to further illustrate and explain this invention and its advantages. For ease in exposition but without intent thereby to limit this invention, the reactants are assumed to be ethylene, acetic acid and oxygen, while the catalyst system is assumed to be cationic tellurium and anionic bromine, with the basicity control cation being lithium cation. Continuous operation is assumed, though this invention is not so limited.

To oxidation zone 10, within which is maintained a liquid phase reaction medium 11, are fed ethylene via conduit 12, oxygen via conduit 13 and acetic acid via conduit 14. Recycle acetic acid and a recycle gas containing unreacted ethylene and oxygen are admixed with fresh reactants prior to introduction to oxidation zone 10 via conduits 16 and 17 respectively. It should be noted that while only the oxygen reactant (together with recycle gas) is shown as introduced through a sparger (18), the ethylene could as readily be introduced in similar fashion. Sparging of the gaseous reactants through the liquid phase reaction medium in this fashion promotes agitation and assists in providing intimate contact of the reactants with the liquid phase reaction medium. Mechanical agitation (not shown) can also be provided, if desired, as can means for removing the heat of reaction. Also introduced to oxidation zone 10 are two additional streams, shown as independently introduced for clarity though readily premixable with one or more of the other reactant streams. The first of these two additional streams, introduced via conduit 19, is the catalyst stream, while the second is a recycled stream of halogenated organic materials, obtained in a manner hereinafter described, introduced via conduit 20.

The catalyst introduced via conduit 19 is in turn derived from two sources. The first of these, supplied from sources extraneous to the system, is make-up for material lost from the system and is supplied in relatively minor amount compared with the total supplied. The other source of catalyst, supplied via conduit 21, communicating with conduit 19, is recycle catalyst and is the predominant source of catalyst introduced to oxidation zone 10. The extraneous source of catalyst can, for example, comprise tellurium dioxide (a source of tellurium cation) with the bromine anion source being, for example, lithium bromide, which has the advantage of being both a source of bromide anion and a preferred source of the basicity control cation (lithium). An equally suitable alternative would involve supply of lithium cation in, say, the form of lithium hydroxide, with the bromine in, say, the form of hydrobromic acid. For ease in handling the mixture, this make-up catalyst stream can be supplied from the extraneous source in the form of a slurry and/or solution of the constituents in acetic acid.

From oxidation zone 10 are withdrawn a gaseous effluent via conduit 22. This gaseous effluent is partially condensed in cooler 23, with the condensed material being then fed to separator 24. Condensed liquids are withdrawn from separator 24 via conduit 25 and transmitted to recovery zone 40. Non-condensed materials (i.e., still gaseous materials) are withdrawn from separator 24 via conduit 26, compressed (compression facilities not shown) and returned to oxidation zone 10 via conduit 27 which communicates with conduit 17. This recycle non-condensed vapor constitutes the primary source of the recycle ethylene and oxygen reactants. A small portion of this recycle vapor is usually purged via conduit 28 to prevent or limit build-up of gaseous impurities in the feeds.

The second stream withdrawn from oxidation zone 10, via conduit 29, is a portion of the liquid phase reaction medium, and is withdrawn at a rate sufficient to maintain a constant inventory of liquid phase reaction medium 11 within oxidation zone 10. The liquid phase reaction medium, like the condensed material, withdrawn from separator 24 via conduit 25, is fed to recovery zone 40. Within recovery zone 40, a series of separations are carried out, the materials separated being essentially by-product water and carbon oxides for discard (withdrawn via conduit 41), acetic acid for recycle (withdrawn via conduit 42 which communicates with conduit 16), the desired ester products consisting of ethylene glycol monoacetate, ethylene glycol diacetate, and a relatively small portion of unesterified ethylene glycol (conduit 43). Halogenated by-products are also withdrawn from recovery zone 40 via conduits 44 and 45 which both communicate with conduit 20 and are thus returned to oxidation zone 10. The materials withdrawn via conduit 44 are those which are most volatile (lower boiling) than the desired ester product while those withdrawn from conduit 45 are those less volatile (higher boiling) than the desired ester products. The final material, withdrawn from recovery zone 40 via conduit 21, comprises catalyst which may be in the form of a slurry of the catalyst components in an organic medium, the organic medium comprising high-boiling ether-alcohol by-products of the reaction, often including a portion of the halogenated by-products which are less volatile than the desired ester products. In one conventional modification of the scheme depicted in the drawing, withdrawal of the high-boiling halogenated byproducts as a separate stream need not be performed since this material can readily be withdrawn with recycle catalyst via conduit 21.

The stream, withdrawn via conduit 21, is the source of the recycled catalyst introduced to oxidation zone 10 via conduit 19 and contains a complex mixture of materials including tellurium oxides, bromides, acetate salts and oxybromides, and perhaps also containing some elemental tellurium. The bromine component of the catalyst system in this recycle catalyst stream (apart from that present in the form of organo-halogen compounds) is essentially in the form of lithium bromide and tellurium bromides and oxybromides. The basicity control cation (lithium) in this recycle catalyst stream, like the tellurium, is present in a complex mixture, largely lithium bromide (irrespective of the form in which originally supplied) but also containing other lithium compounds including hydroxide, oxybromide and acetate. A portion of this catalyst stream would normally be purged (via conduit 46) to prevent uncontrolled build-up of the high-boiling organic materials used as the carrying agent for this recycle catalyst stream and could be discarded or treated for recovery of metal and/or halogen values.

Recovery zone 40 is depicted in the drawing schematically as it represents a series of distillation columns of conventional type and design, well understood by those skilled in the art, and thus not requiring detailed exposition.

It has previously been indicated that the nature of the reaction effluents, i.e., the material withdrawn from oxidation zone 10 via conduit 29, is substantially different from that obtained by prior art practice. In the prior art, the halogenated byproducts supplied to oxidation zone 10 via conduit 20 would provide a large, indeed predominant, portion of the bromine needed as a catalyst component for the reaction, while the bromine in the recycle catalyst stream would be small in relation to the whole. In this invention, however, especially in preferred embodiments, while the amount of halogen required to catalyze the reaction remains roughly comparable, the proportion of it supplied by recycle of the halogenated organic byproducts is reduced, and the amount supplied by recycle of caalyst components is increased. And in the preferred regime of operation, the amount of halogen supplied via the recycled catalyst (i.e., inorganic halogen) can often predominate, to the extent of being as much as 60–70% of the total halogen required. With the prior art system, the halogenated byproducts were the predominant source of halogen recycled to the reactor and thus practice of this invention can reduce the amount of organic halogen to be handled by as much as a factor of 2 or even more. This is a consequence of obtaining a reaction effluent of different composition, containing a lesser proportion of halogenated organics and an increased proportion of inorganic halgoen than those heretofore obtained. It is noted that while it is obviously desirable to recycle the totality of halogenated by-products to the reaction, this may not always be commercially practicable since the portion of the catalyst purged via conduit 46 may contain a small quantity of halogenated organic reaction by-products. Small amounts of halogenated by-product may be present as contaminants in the ester product though these can readily be removed therefrom. (See application Ser. No. 220,889, filed Jan. 26, 1972.)

Obvious modifications to the system described above and depicted in the drawing are readily apparent. One such modification would entail removal of the liquid phase reaction medium by volatilization rather than withdrawal via conduit 29. In this embodiment, the totality of the product withdrawn from the oxidation zone would be withdrawn via conduit 22, and no recycle of catalyst would be required. The only material withdrawn via conduit 29 thus would be the small quantity of purge needed to prevent build-up of high-boiling organic by-products and would be roughly comparable in quantity to the amount purged via conduit 46.

Obviously, though only one oxidation zone is depicted, several such zones connected in series or in parallel (or both) can be employed.

THE EXAMPLES

The following examples are presented to further illustrate this invention but are not intended to limit the scope thereof. Unless otherwise stated, all parts and percents in the descriptions of the examples are on a weight basis. As used in the description of the examples, as well as throughout the entirety of this specification, the following terms have the following meanings:

selectivity means moles of ester product and precursors thereof (expressed as equivalents of ester product) which are formed per mole of olefinically unsaturated compound reacting, generally expressed as a percentage.

rate refers to the gram-moles of ester product and precursors thereof (expressed as equivalents of ester product) formed per hour per liter of liquid phase reaction medium within the oxidation zone.

Example 1

Apparatus similar to that depicted in the drawing, comprising a 7.5-liter jacketed titanium autoclave, with an overflow draw-off pipe affixed at a point sufficient to maintain a 6.8 liter liquid volume within the autoclave, is employed. The autoclave is initially filled to the overflow point with a slurry of tellurium dioxide and lithium bromide suspended and/or dissolved in 95% acetic acid. Overall, the slurry contains 1.5% of the dioxide and 8% of the bromide. The autoclave is then heated under nitrogen to 170°C. and olefin and oxygen feeds are commenced (mole ratio of oxygen to ethylene is 0.58:1). The oxygen employed is of 95% (mole) purity containing about 4% (mole) nitrogen and 1% (mole) argon. Pressure is maintained at 28.2 atmospheres absolute by regulating rate of gas withdrawal from the autoclave. Gas withdrawn is compressed and recycled for admixture with the fresh gaseous reactants supplied, while a portion is purged to prevent uncontrolled build-up of diluents (such as nitrogen and argon). The purged materials is first cooled to 38°C. to recover the acetic acid contained therein. This acetic acid is recycled to the autoclave.

Liquid phase reaction medium is withdrawn as it builds up to the overflow line and distilled (a) to eliminate water and carbon oxides together with minor amounts of other low-boiling materials from the system, (b) to recover unconverted acetic acid for recycle to the autoclave and (c) halogenated precursors (primarily 1-acetoxy-2-bromoethane but also containing some bromohydrin and other brominated species, collectively referred to as "halogenated lights" below) having boiling points less than that of the ethylene glycol esters which are also recycled to the autoclave in admixture with the acetic acid. Glycol esters are recovered and all materials, brominated or otherwise, having boiling points greater than 1,2-diacetoxy ethane, including catalyst components, are recycled to the autoclave. Make-up acetic acid is supplied, initially in the form of the slurry described above (to prevent depletion of catalyst components as liquid phase is withdrawn) and then as glacial acetic acid, at a rate sufficient to maintain a constant draw-off rate of liquid phase reaction medium. The withdrawal rate corresponds roughly to a three-quarter hour residence time (as hereinbefore defined).

After about 10 hours of continuous operation in the manner described above, during which samples are periodically taken and analyzed to ascertain composition, steady state operation is achieved. The following Table indicates relevant stream compositions and flows (in grams/hr) after steady state is attained. Although provision for catalyst purge and make-up exist, over the 96 hour duration of the operation, no such make-up or purge is needed.

TABLE I

| Component | Feeds | Liquid Phase Withdrawn | Purges | Recycled Liquid Streams | | Product |
|---|---|---|---|---|---|---|
| | | | | Lights(4) | Heavies(5) | |
| Ethylene | 410 | — | <1 | — | — | — |
| Oxygen | 271(1) | — | <1 | — | — | — |
| Carbon oxides | — | 9 | 13 | — | — | — |
| Light by-prod.(2) | — | 18 | 18 | — | — | — |
| Water | — | 459 | 414 | 45 | — | — |
| Acetic Acid | 1395 | 4617 | — | 4617 | — | — |
| Halogenated Lights | — | 63 | — | 63 | — | — |
| Glycol esters | — | 2646 | — | 9 | 801 | 1836 |
| Heavy mat'ls (3) | — | 603 | — | — | 603 | — |
| Catalyst | | | | | | |
| Br | — | 477 | — | — | 477 | — |
| Te | — | 54 | — | — | 54 | — |
| Li | — | 54 | — | — | 54 | — |

Notes
(1) 95% purity; composition given above.
(2) Primarily ethyl acetate and acetaldehyde.
(3) Primarily diethylene glycol mono- and di-acetate and 2,2'-dibromodiethyl ether though other materials are present including minor amounts of triglycol derivatives. About 25 wt. % of compounds present are halogen-containing.
(4) Boiling points less than glycol esters.
(5) Boiling points greater than glycol esters.

Analysis indicates that the selectivity obtained according to the foregoing procedure is 96.5%, while rate of product formation is 2.8 gram-mole/liter-hour. Detailed analysis of the withdrawn liquid phase (comparable to the material withdrawn via conduit 29 of the drawing) indicates presence of less than 0.3 wt. % of total formate moieties in the liquid phase.

By way of contrast, the foregoing experimental procedure is repeated except for the following modifications: no basicity control cation is employed; instead, the bromide anion is supplied by injection of an amount of elemental bromine such that the same quantity of bromine is supplied in the elemental form as was supplied in the form of lithium bromide above. In this comparison, selectivity is only 88%, although rate is essentially comparable to that obtained in the foregoing example. In contrast, however, over 3% of the liquid phase withdrawn from the autoclave in the form of formic acid and/or formate moieties. This comparison, not illustrative of the invention, is yet again repeated, with all conditions being those employed in the example save for the use of an equimolar amount of a 48% (wt.) HBr aqueous solution, employed in lieu of the elemental bromine used in the comparison just described. Additionally, reaction temperature is reduced from 170°C. to 160°C. No significant change is detected between this comparison and that described immediately above.

Additionally, Example I above is repeated yet again employing an equimolar amount of propionic acid in lieu of acetic acid. Essentially comparable results to those obtained in Example I are observed, though in this case, analysis of the withdrawn liquid phase is conducted so as to detect not only formate moieties but also acetate moieties. Production of ethylene glycol propionates, both in terms of rate of formation and selectivity, is comparable to that observed in Example I above.

Again, Example I above is repeated employing an equimolar amount of propylene in lieu of ethylene as the reactant. Although stream compositions change somewhat, an overall rate of 3.8 gram-moles/liter-hour and a 92% selectivity are obtained. Formate level detected in the withdrawn liquid phase is 0.25 wt. % of formate moieties expressed as formic acid.

Finally, the procedure of Example I above is repeated employing a mixture of cobalt bromide and cobalt acetate to provide the same concentration of equivalents of cobalt as lithium and the same concentration, in terms of gram-atoms of bromine within the liquid phase reaction medium as is employed in Example I above. Except for minor changes in intermediate stream compositions, results are not significantly different from those observed in Example I above. Rate, selectivity and amount of formate moieties in the withdrawn liquid phase are essentially the same.

Example II

A series of runs are carried out within a 1-liter agitated jacketed titanium autoclave. In each of the following runs, a charge containing 450 grams acetic acid, 5 grams of tellurium dioxide, 20.1 grams of water and a total of 232 millimoles of bromide anion are charged in addition to the indicated amount of basicity control cation. The amount of basicity control cation is expressed in terms of ratio of equivalents of basicity control cation per gram-atom of bromine (denominated as "Ratio" in the Table below). Following initial charge, the autoclave is pressured with nitrogen to 21.4 atm. abs., and a gas feed made up of 40 litres/hour of oxygen, 60 liters/hour of ethylene and 210 liters/hour of ethane (gas flows measured at 0°C. and 760 mm Hg) is commenced. The autoclave is then rapidly heated to 160°C. (over a 30–45 minute period). The autoclave is maintained at 160°C. for 2 hours and then cooled and depressured. During operation, the autoclave is maintained at 21.4 atm. abs. by venting sufficient vapor from the reactor. This vented vapor is cooled to condense and recover acetic and formic acids therein, and the cooled vapor is analyzed for carbon oxides. The formic acid recovered is included below in the analysis for % Formate. The liquid effluents are withdrawn and analyzed for glycol moieties and formate moieties. The total concentration of glycol moieties present, expressed in terms of equivalent amount of 1,2-diacetoxyethane (ethylene glycol diacetate, abbreviated as "EGDA"), is a direct index of rate of reaction since reaction time in all runs below is constant. The following Table indicates the results obtained. In this Table, numbered runs are illustrative of the invention while lettered runs are controls presented for comparative purposes only.

TABLE II

| Run No. | Basicity Control Cation | Ratio | Wt. % of EGDA | % Formate |
| --- | --- | --- | --- | --- |
| A | none | — | 40.5 | 0.87 |
| B | none | — | 38.7 | 0.93 |
| 1 | Li | 0.14:1 | 28.0 | 0.43 |
| 2 | Li | 0.27:1 | 28.1 | 0.27 |
| 3 | Li | 1:1 | 21.0 | 0.11 |
| 4 | Li | 1:1 | 24.3 | 0.14 |
| 5 | Li | 1.5:1 | 18.2 | 0.07 |
| 6 | Mg | 0.14:1 | 33.7 | 0.55 |
| 7 | Mg | 0.27:1 | 30.2 | 0.44 |
| 8 | Zn | 0.5:1 | 13.6 | 0.11 |
| 9 | Ca | 1:1 | 26.4 | 0.18 |
| 10 | Mn | 0.15:1 | 32.4 | 0.30 |
| 11 | Mn | 1:1 | 13.2 | 0.08 |
| 12 | Ni | 0.5:1 | 17.0 | 0.23 |
| 13 | Co | 0.1:1 | 40.9 | 0.51 |
| 14 | Co | 0.3:1 | 34.1 | 0.32 |
| 15 | Co | 0.8:1 | 32.4 | 0.27 |
| 16 | Co | 1:1 | 26.5 | 0.20 |
| 17 | Co | 1.5:1 | 25.4 | 0.14 |
| 18 | Co | 2.0:1 | 25.9 | 0.07 |
| 19 | Ce | 1.5:1 | 15.3 | 0.06 |
| 20 | As | 1.5:1 | 25.2 | 0.17 |
| 21 | Sb | 1.5:1 | 23.2 | 0.14 |
| 22 | Na | 0.25:1 | 20.7 | 0.14 |
| 23 | Na | 0.5:1 | 18.6 | 0.08 |
| 24 | Fe | 0.25:1 | 34.2 | 0.46 |
| 25 | Cr | 0.1:1 | 36.8 | 0.54 |
| 26 | Mo | 0.1:1 | 35.4 | 0.52 |
| 27 | Sc | 0.1:1 | 34.6 | 0.45 |
| 28 | Y | 0.1:1 | 32.5 | 0.41 |
| 29 | Bi | 1:1 | 28.9 | 0.31 |
| 30 | Cu | 0.5:1 | 36.7 | 0.51 |
| 31 | triethylamine | 0.5:1 | 27.2 | 0.09 |
| 32 | pyridine | 1:1 | 25.4 | 0.24 |

TABLE II -Continued

| Run No. | Basicity Control Cation | Ratio | Wt. % of EGDA | % Formate |
|---|---|---|---|---|
| 33 | pyrrole | 1:1 | 26.7 | 0.28 |
| 34 | indole | 1:1 | 30.2 | 0.31 |
| 35 | triphenylamine | 2:1 | 26.2 | 0.15 |
| 36 | tetraethylammonium | 1:1 | 23.4 | 0.08 |

Controls A and B above employ HBr and 2-bromoethyl acetate respectively as the bromine source, with no basicity control cation being employed. These two controls therefore provide base points against which the runs illustrative of the invention can readily be evaluated.

In all of the above runs except Nos. 4, 5, 20 and 31–36, the basicity control cation is supplied in the form of the acetate. In Runs 4 and 5, the cation is supplied as an equimolar mixture of the bromide and acetate salts, with the additional bromide anion needed in Run 4 being supplied as HBr. In Run 20, the cation is supplied in the form of arsenious acid; note that though the arsenic is contained in the anion portion of the inorganic source, the highly amphoteric nature of arsenic itself results in the arsenate anion decomposing within the reaction mixture to yield cationic arsenic. The organic materials used as basicity control cations in Runs 31–35 are supplied as the compounds. The tetraethylammonium cation used in Run 36 is supplied as the hydroxide.

Examination of the foregoing date (note Runs 1–5 and 13–18) indicates that introduction of the basicity control cation can often (but not always) reduce reaction rate at constant temperature. Even when rate is initially decreased, as the amount of cation employed increases, rate decreases but slightly after the initial rate loss; however, though rate seemingly approaches an asymptote, the amount of formic acid produced continues to decline. Additionally, a substantially reduced amount of carbon oxides are produced in Runs 1–36 than are detected in the controls.

Example III

The procedure described above in connection with Example II is repeated employing lithium and cobalt as the basicity control cations, with these cations supplied in a variety of forms. In each run, the basicity control cation is supplied in an amount sufficient to give a ratio of equivalent of cation per equivalent of halogen which is 1:1. The following list indicates the types of compounds used. Results in each case are essentially the same as obtained in Runs 3 and 4 of Example II when lithium is the cation and essentially the same as those obtained in Run 16 of Example II when cobalt is the cation.

| Lithium | Cobalt |
|---|---|
| ethoxide | hydroxide |
| carbonate | oleate |
| citrate | oxide |
| sulfate | phosphate |
| nitrate | elemental (powdered) |
| hydroxide | |
| aluminate | |
| phenate | |
| stearate | |
| bicarbonate | |
| elemental | |

Example IV

A series of runs are carried out following the procedure described in connection with Example II; however, temperature is varied from run to run. In each of Runs 1–5 below, lithium is the cation and is employed in an amount sufficient to give a ratio (see Example II) of 1:1. In each of Runs 6–9 below, the cation is cobalt and is employed in a ratio (see Example II) of 1:1. In each case, the basicity control cation is charged in the form of the acetate salt, while the bromine source is either HBr or 2-bromoethylacetate. No basicity control cation is used in the controls (lettered runs C, D and E). The following Table indicates the results obtained.

TABLE III

| Run No. | (effect of temperature) Temp.°C. | Wt. % EGDA | % Formate |
|---|---|---|---|
| 1 | 155 | 12.4 | 0.07 |
| 2 | 165 | 26.7 | 0.17 |
| 3 | 180 | 47.5 | 0.20 |
| 4 | 200 | 53.2 | 0.29 |
| 5 | 220 | 52.1 | 0.37 |
| 6 | 155 | 19.2 | 0.12 |
| 7 | 165 | 28.5 | 0.20 |
| 8 | 180 | 38.7 | 0.19 |
| 9 | 200 | 48.2 | 0.21 |
| C | 150 | 38.6 | 0.84 |
| D | 170 | 40.2 | 0.87 |
| E | 190 | 39.8 | 0.91 |

Contrasting the above data with the data of Example II Indicates that any initial reduction in rate associated with use of some basicity control cations is readily overcome by adjusting reaction temperature. On the other hand, in the absence of a basicity control cation (Controls C, D and E), raising temperature does not significantly affect rate or formates produced.

Example V

A series of runs are carried out using selenium dioxide, with both bromide and chloride anions, in place of the tellurium dioxide of Example II but otherwise employing the procedure and apparatus there described. Thus, the charge mixture contains 3.5 grams of $SeO_2$ except in Controls F and G, which employ 5.0 grams of $TeO_2$. No basicity control cation is used in Controls H and J, which are base-point runs comparable to Controls A and B. In the other runs, lithium (supplied as the acetate) is employed in an amount sufficient to provide a Ratio (as defined in Example II) of 1:1. Table IV, which follows, illustrates the results obtained.

TABLE IV

| Run No. | Halide Anion | Temp.°C. | Wt. % EGDA | % Formate |
|---|---|---|---|---|
| F | Cl | 150 | 0.2 | 0.06 |
| G | Cl | 200 | 2.6 | 0.34 |
| H | Cl | 160 | 8.9 | 0.62 |
| J | Br | 160 | 27.4 | 0.96 |

TABLE IV-Continued

| Run No. | Halide Anion | Temp.°C. | Wt. % EGDA | % Formate |
|---|---|---|---|---|
| 1 | Cl | 160 | 2.8 | <0.06 |
| 2 | Br | 160 | 19.2 | 0.11 |
| 3 | Cl | 200 | 6.6 | 0.06 |
| 4 | Br | 200 | 50.4 | 0.19 |

Controls F and G demonstrate that Te plus Cl is an extremely inactive catalyst system with ethylene at any temperature. Controls H and J indicate that selenium plus chlorine and/or bromine are, however, effective, with the chlorine being considerably less active and thus less to be preferred; these controls also demonstrate that the formate formation problem is not unique to tellurium alone. Runs 1–4 demonstrate that formate formation can be sharply reduced by practice of this invention and that no rate penalty need be incurred since an increase in temperature can restore the rate to, or in excess of, the base levels indicated by Controls H and J.

Controls K and L

In these two runs, the reaction system of U.S. Pat. No. 3,479,395 is studied by preparing a solution containing 1 wt. % $TeO_2$ in an acetic acid solution having 15 wt. % of LiCl (Control K) or LiBr (Control L) dissolved therein. After treatment at 75°C. to dissolve the $TeO_2$, 468 grams of the solution are charged to an autoclave. The autoclave is also charged with 32 grams of butene-2 and pressured to 300 p.s.i.g. (21.4 atms.abs.) with $N_2$ at 25°C. Flow of a gas feed is commenced, with the gas consisting of 40 liters/hour of $O_2$; 150 liters/hour of ethane; 60 liters/hour of nitrogen and 60 liters/hour of butene-2 (gas flow volumes expressed at 25°C. and 760 mm Hg). The autoclave is then heated to 150°C. for 2 hours and then cooled. With LiCl, the effluents contained 9 moles of $CO_2$ per mole of 2,3-diacetoxybutane and, with LiBr, contained 7 moles of $CO_2$ per mole of 2,3-diacetoxybutane as well as, in both cases, a large amount of other byproducts — indicative of very low selectivities.

Example VI

A series of runs similar to those of Runs 1–5 and 13–18 of Example II, employing propylene instead of ethylene, are carried out. Rates of formation of 1,2-diacetoxypropane and % Formate levels are comparable to those observed in Example II. Selectivity exceeds 85 mole %; however, when Control A is repeated with propylene instead of ethylene, selectivity is less than 80 mole % while % Formate exceeds 3%.

In another series of runs similar to Runs 13–18 of Example II, acetic acid is replaced with formic acid (analysis for CO and $CO_2$ gives selectivity values employed), propionic acid and n-pentan-1-oic acid. Similar results are obtained.

Control M

A series of runs are carried out using the procedure of Example II but employing, as basicity control cations, a group of materials having activity coefficients less than 0.4 but which display an absence of a pH-reducing effect. The materials tested are silver, mercury, cadmium and lead, orginally supplied to the reaction system in the form of their oxides in an amount sufficient to give a Ratio (see Example II) of 1:1. After conclusion of the 2-hour reaction period, only traces of EGDA are found with silver or mercury (i.e., less than 0.2 wt. %). With lead, 2.4 wt. % EGDA is found, while with cadmium, 4.7 wt. % EGDA is found. Thus, the rate displayed in all runs is much too low to be of significance.

To illustrate the situation where a material having both a high activity coefficient and a pH-reducing effect is employed, the procedure of Example II is repeated, employing 1 mole of $H_2SO_4$ per mole of total bromine. A marginally higher amount of EGDA is formed (45.3 wt. % expressed on the same basis as used in Example II); however, the % formate increases sharply — to 1.52 wt. %. Thus, the series of runs described in this control demonstrates the importance of both a high activity coefficient and an absence of a pH-reducing effect.

What is claimed is:

1. In the process for the continuous preparation of $C_1$–$C_5$ hydrocarbyl aliphatic carboxylic acid esters of $C_2$–$C_3$ vicinal glycols by the catalytic liquid phase reaction of (a) an olefin corresponding in structure to the glycol moiety of said ester and selected from the group consisting of ethylene and propylene, (b) molecular oxygen and (c) a monobasic aliphatic hydrocarbyl carboxylic acid of 1-5 carbon atoms corresponding in structure to the acyl moiety of said ester; the catalyst for said reaction being a tellurium or selenium cation in combination with a halide anion, the combination being selected from the group consisting of tellurium cation plus bromide anion, selenium cation plus bromide anion and selenium cation plus chloride anion; said reaction being carried out within an oxidation zone containing a liquid phase reaction medium comprising reactants, catalyst and reaction products including the carboxylic acid esters and halogenated byproducts; wherein reactants are continuously introduced into the oxidation zone and at least a portion of the liquid phase reaction medium is continuously withdrawn, the withdrawn portion of the reaction medium being processed to recover carboxylic acid ester product, unconverted reactants and halogenated by-products and wherein the recovered unconverted reactants are recycled to the oxidation zone; the improvement which comprises:

minimizing selectivity losses while maximizing rate of formation of carboxylic acid ester product by recycling at least a predominant portion of the halogenated byproducts to the oxidation zone to provide a substantial portion of the halogen component of the catalyst system while conducting the reaction at a temperature exceeding 150°C. but not in excess of about 250°C. in the presence of at least 0.05 equivalent of a basicity control cation per gram-atom of halogen anion in the liquid phase reaction medium, said basicity control cation having, when in the form of a salt with the halide corresponding to that of the catalyst system, an activity coefficient of at least 0.40 and said basicity control cation not having a pH-reducing effect when in the form of a salt with the carboxylic acid reactant, the basicity control cation being selected from at least one member of the group consisting of the alkaline earth metals, the lanthanides, scandium, yttrium, iron, cobalt, nickel, zinc, bismuth, chromium, manganese, molybdenum, copper, arsenic, antimony, alkyl amines, alkyl quaternary ammonium salts, phenyl amines, pyrrole, pyridine, indole and alkyl-substituted pyrroles, pyridines and indoles.

2. In the process for the continuous preparation of $C_1$–$C_5$ hydrocarbyl aliphatic carboxylic acid esters of $C_2$–$C_3$ vicinal glycols by the catalytic liquid phase reaction of (a) an olefin corresponding in structure to the glycol moiety of said ester and selected from the group consisting of ethylene and propylene, (b) molecular oxygen and (c) a monobasic aliphatic hydrocarbyl carboxylic acid or 1–5 carbon atoms corresponding in structure to the acyl moiety of said ester; the catalyst for said reaction being a tellurium or selenium cation in combination with a halide anion, the combination being selected from the group consisting of tellurium cation plus bromide anion, selenium cation plus bromide anion and selenium cation plus chloride anion; said reaction being carried out within an oxidation zone containing a liquid phase reaction medium comprising reactants, catalyst and reaction products including the carboxylic acid esters and halogenated byproducts; wherein reactants are continuously introduced into the oxidation zone and at least a portion of the liquid phase reaction medium is continuously withdrawn, the withdrawn portion of the reaction medium being processed to recover carboxylic acid ester product, unconverted reactants and halogenated by-products and wherein the recovered unconverted reactants are recycled to the oxidation zone; the improvement which comprises:

minimizing selectivity losses while maximizing rate of formation of carboxylic acid ester product by recycling at least a predominant portion of the halogenated by-products to the oxidation zone to provide a substantial portion of the halogen component of the catalyst system while conducting the reaction at a temperature exceeding 150°C. but not in excess of about 250°C. in the presence of at least 0.05 equivalent of a basicity control cation per gram-atom of halogen anion in the liquid phase reaction medium, said basicity control cation having, when in the form of a salt with the halide corresponding to that of the catalyst system, an activity coefficient of at least 0.40 and said basicity control cation not having a pH-reducing effect when in the form of a salt with the carboxylic acid reactant, the basicity control cation being selected from at least one member of the group consisting of the lanthanides, scandium, yttrium, iron, cobalt, nickel, zinc, bismuth, chromium, manganese, molybdenum, copper, arsenic, antimony, alkyl amines, alkyl quaternary ammonium salts, phenyl amines, pyrrole, pyridine, indole and alkyl-substituted pyrroles, pyridines and indoles.

3. In the process for the continuous preparation of $C_1$–$C_5$ hydrocarbyl aliphatic carboxylic acid esters of $C_2$–$C_3$ vicinal glycols by the catalytic liquid phase reaction of (a) an olefin corresponding in structure to the glycol moiety of said ester and selected from the group consisting of ethylene and propylene, (b) molecular oxygen and (c) a monobasic aliphatic hydrocarbyl carboxylic acid of 1–5 carbon atoms corresponding in structure to the acyl moiety of said ester; the catalyst for said reaction being a tellurium or selenium cation in combination with a halide anion, the combination being selected from the group consisting of tellurium cation plus bromide anion, selenium cation plus bromide anion and selenium cation plus chloride anion; said reaction being carried out within an oxidation zone containing a liquid phase reaction medium comprising reactants, catalyst and reaction products including the carboxylic acid esters and halogenated byproducts; wherein reactants are continuously introduced into the oxidation zone and at least a portion of the liquid phase reaction medium is continuously withdrawn, the withdrawn portion of the reaction medium being processed to recover carboxylic acid ester product, unconverted reactants and halogenated by-products and wherein the recovered unconverted reactants are recycled to the oxidation zone; the improvement which comprises:

minimizing selectivity losses while maximizing rate of formation of carboxylic acid ester product by recycling at least a predominant portion of the halogenated by-products to the oxidation zone to provide a substantial portion of the halogen component of the catalyst system while conducting the reaction at a temperature exceeding 150°C. but not in excess of about 250°C. in the presence of at least 0.05 equivalent of a basicity control cation per gram-atom of halogen anion in the liquid phase reaction medium, said basicity control cation having, when in the form of a salt with the halide corresponding to that of the catalyst system, an activity coefficient of at least 0.40 and said basicity control cation not having a pH-reducing effect when in the form of a salt with the carboxylic acid reactant, the basicity control cation being selected from at least one member of the group consisting of alkyl amines, alkyl quaternary ammonium salts, phenyl amines, pyrrole, pyridine, indole and alkyl-substituted pyrroles, pyridines and indoles.

4. In the process for the continuous preparation of $C_1$–$C_5$ hydrocarbyl aliphatic carboxylic acid esters of $C_2$–$C_3$ vicinal glycols by the catalytic liquid phase reaction of (a) an olefin corresponding in structure to the glycol moiety of said ester and selected from the group consisting of ethylene and propylene, (b) molecular oxygen and (c) a monobasic aliphatic hydrocarbyl carboxylic acid of 1–5 carbon atoms corresponding in structure to the acyl moiety of said ester; the catalyst for said reaction being a tellurium or selenium cation in combination with a halide anion, the combination being selected from the group consisting of tellurium cation plus bromide anion, selenium cation plus bromide anion and selenium cation plus chloride anion; said reaction being carried out within an oxidation zone containing a liquid phase reaction medium comprising reactants, catalyst and reaction products including the carboxylic acid esters and halogenated by-products, wherein reactants are continuously introduced into the oxidation zone and at least a portion of the liquid phase reaction medium is continuously withdrawn, the withdrawn portion of the reaction medium being processed to recover carboxylic acid ester product, unconverted reactants and halogenated by-products and wherein the recovered unconverted reactants are recycled to the oxidation zone; the improvement which comprises:

minimizing selectivity losses while maximizing rate of formation of carboxylic acid ester product by recycling at least a predominant portion of the halogenated by-products to the oxidation zone to provide a substantial portion of the halogen component of the catalyst system while conducting the reaction at a temperature exceeding 150°C. but not in excess of about 250°C. in the presence of at least 0.05 equivalent of a basicity control cation per gram-atom of halogen anion in the liquid phase reaction medium, said basicity control cation having, when in the form of a salt with the halide corresponding to that of the catalyst system, an activity coefficient of at least 0.40 and said basicity control cation not having a pH-reducing effect when in the form of a salt with the carboxylic acid reactant, the basicity control cation being selected from at least one member of the group consisting of magnesium, zinc, calcium, manganese, nickel, cobalt, cerium, arsenic, antimony, iron, chromium, molybdenum, scandium, yttrium, bismuth and copper.

5. In the process for the continuous preparation no $C_1$–$C_5$ hydrocarbyl aliphatic carboxylic acid esters of $C_2$–$C_3$ vicinal glycols by the catalytic liquid phase reaction of (a) an olefin corresponding in structure to the glycol moiety of said ester and selected from the group consisting of ethylene and propylene, (b) molecular oxygen and (c) a monobasic aliphatic hydrocarbyl carboxylic acid of 1–5 carbon atoms corresponding in structure to the acyl moiety of said ester; the catalyst for said reaction being a tellurium or selenium cation in combination with a halide anion, the combination being selected from the group consisting of tellurium cation plus bromide anion, selenium cation plus bromide anion and selenium cation plus chloride anion; said reaction being carried out within an oxidation zone containing a liquid phase reaction medium comprising reactants, catalyst and reaction products including the carboxylic acid esters and halogenated byproducts; wherein reactants are continuously introduced into the oxidation zone and at least a portion of the liquid phase reaction medium is continuously withdrawn, the withdrawn portion of the reaction medium being processed to recover carboxylic acid ester product, unconverted reactants and halogenated by-products and wherein the recovered unconverted reactants are recycled to the oxidation zone; the improvement which comprises:

minimizing selectivity losses while maximizing rate of formation of carboxylic acid ester product by recycling at least a predominant portion of the halogenated by-products to the oxidation zone to provide a substantial portion of the halogen component of the catalyst system while conducting the reaction at a temperature exceeding 150°C. but not in excess of about 250°C. in the presence of at least 0.05 equivalent of a basicity control cation per gram-atom of halogen anion in the liquid phase reaction medium, said basicity control cation having, when in the form of a salt with the halide corresponding to that of the catalyst system, an activity coefficient of at least 0.40 and said basicity control cation not having a pH-reducing effect when in the form of a salt with the carboxylic acid reactant, the basicity control cation being selected from at least one member of the group consisting of zinc, manganese, nickel, cobalt, cerium, arsenic, antimony, iron, chromium, molybdenum, scandium, yttrium, bismuth and copper.

6. A process in accordance with claim 5 wherein the basicity control cation is cobalt.

7. A process in accordance with claim 5 wherein the catalyst combination is tellurium cation plus a bromide anion.

8. A process in accordance with claim 6 wherein the catalyst combination is tellurium cation plus bromide anion.

9. A process in accordance with claim 5 wherein the olefin is ethylene.

10. A process in accordance with claim 5 wherein the olefin is ethylene and the carboxylic acid is acetic acid.

11. A process in accordance with claim 5 wherein the reaction temperature is in excess of 155°C. but not in excess of about 240°C.

12. A process in accordance with claim 6 wherein reaction temperature is in excess of 155°C. but not in excess of about 240°C.

13. A process in accordance with claim 5 wherein the basicity control cation is employed in an amount of at least 0.2 equivalent of basicity control cation per gram-atom of total halogen present in the liquid phase reaction medium.

14. A process in accordance with claim 5 wherein the amount of basicity control cation employed is between about 0.2 equivalent per gram-atom of total halogen and about 3.0 equivalents of basicity control cation per gram-atom of total halogen.

15. A process in accordance with claim 5 wherein the amount of basicity control cation employed is between about 0.5 equivalent per gram-atom of total halogen and about 1.5 equivalents of basicity control cation per gram-atom of total halogen.

16. A process in accordance with claim 5 wherein the olefin is ethylene; the carboxylic acid is acetic acid; the reaction temperature is in excess of 155°C. but not in excess of about 240°C.; the catalyst combination is tellurium employed in an amount between 0.4 and 3.0 wt. % of the liquid phase reaction medium plus bromine employed in an amount between 5 and 20 gram-atoms of bromine per gram-atom of tellurium; and, the amount of basicity control cation employed is between 0.5 and 1.5 equivalents of basicity control cation per gram-atom of total halogen within the liquid phase reaction medium.

17. A process in accordance with claim 5 wherein the olefin is propylene; the carboxylic acid is acetic acid; the reaction temperature is in excess of 155°C. but not in excess of about 240°C.; the catalyst combination is tellurium employed in an amount between 0.4 and 3.0 wt. % of the liquid phase reaction medium plus bromine employed in an amount between 5 and 20 gram-atoms of bromine per gram-atom of tellurium; and, the amount of basicity control cation employed is between 0.5 and 1.5 equivalents of basicity control cation per gram-atom of total halogen within the liquid phase reaction medium.

18. A process in accordance with claim 3 wherein the catalyst combination is tellurium cation plus a bromide anion.

19. A process in accordance with claim 3 wherein the olefin is ethylene.

20. A process in accordance with claim 3 wherein the olefin is ethylene and the carboxylic acid is acetic acid.

21. A process in accordance with claim 3 wherein the reaction temperature is in excess of 155°C. but not in excess of about 240°C.

22. A process in accordance with claim 3 wherein the basicity control cation is employed in an amount of at least 0.2 equivalent of basicity control cation per gram-atom of total halogen present in the liquid phase reaction medium.

23. A process in accordance with claim 3 wherein the amount of basicity control cation employed is between about 0.2 equivalent per gram-atom of total halogen and about 3.0 equivalents of basicity control cation per gram-atom of total halogen.

24. A process in accordance with claim 3 wherein the amount of basicity control cation employed is between about 0.5 equivalent per gram-atom of total halogen and about 1.5 equivalents of basicity control cation per gram-atom of total halogen.

25. A process in accordance with claim 3 wherein the olefin is ethylene; the carboxylic acid is acetic acid; the reaction temperature is in excess of 155°C. but not in excess of about 240°C.; the catalyst combination is tellurium employed in an amount between 0.4 and 3.0 wt. % of the liquid phase reaction medium plus bromine employed in an amount between 5 and 20 gram-atoms of bromine per gram-atom of tellurium; and, the amount of basicity control cation employed is between 0.5 and 1.5 equivalents of basicity control cation per gram-atom of total halogen within the liquid phase reaction medium.

26. A process in accordance with claim 3 wherein the olefin is propylene; the carboxylic acid is acetic acid; the reaction temperature is in excess of 155°C. but not in excess of about 240°C., the catalyst combination is tellurium employed in an amount between 0.4 and 3.0 wt. % of the liquid phase reaction medium plus bromine employed in an amount between 5 and 20 gram-atoms of bromine per gram-atom of tellurium; and, the amount of basicity control cation employed is between 0.5 and 1.5 equivalents of basicity control cation per gram-atom of total halogen within the liquid phase reaction medium.

* * * * *

UNITED STATES PATENT OFFICE
CERTIFICATE OF CORRECTION

PATENT NO. : 3,907,874
DATED : September 23, 1975
INVENTOR(S) : Robert Joseph Harvey, John Kollar, John Philip Schmidt It is certified that error appears in the above-identified patent and that said Letters Patent are hereby corrected as shown below:

Col. 1, line 46-47: "...only the oxidation reactive reaction olefins..." should be -- ... only the oxidation of reactive olefins ... --
       line 54: "acid" should be --aid--
       line 55: "be" should be -- he --
Col. 2, line 62: "have been" should be -- have not been --
Col. 3, line 4: "disadvantages" should be -- advantages --
       line 32: "Presence of absence" should be -- Presence or absence --
Col. 4, line 51: "conpoment" should be -- component --
Col. 5, line 4: "increased about" should be -- increased above about --
Col. 6, line 3: "92-88 mole %" should be -- 92-98 mole % --
       line 25: "large" should be -- larger --
Col. 7, line 42: "there" should be -- these --
Col. 8, line 14: Insert -- b. -- before the caption
       line 18: "in" should be -- to --
Col. 9, line 3: Insert -- c. -- before the caption
       line 11: "ot" should be -- or --
       line 23: "or" should be -- nor --
Col. 10, line 9: "seen" should be -- seem --
       line 62: "1:0,001" should be -- 1:0.001 --
Col. 13, line 41: "most" should be -- more --
Col. 14, line 30: "caalyst" should be -- catalyst --
       line 63: "roughtly" should be -- roughly --
Col. 17, line 2: "autoclave in" should be -- autoclave is in --
Col. 23, line 47: "yttium" should be -- yttrium --

Signed and Sealed this tenth Day of February 1976

[SEAL]

Attest:

RUTH C. MASON
*Attesting Officer*

C. MARSHALL DANN
*Commissioner of Patents and Trademarks*